March 4, 1941. F. F. WILDEBUSH 2,233,689
APPARATUS FOR DEVELOPING VISUAL FUSION
Filed Oct. 20, 1937
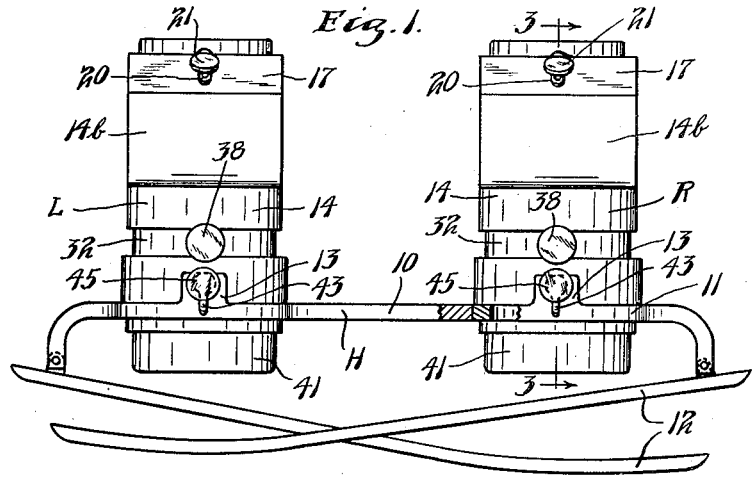
INVENTOR.
FRANK F. WILDEBUSH.
BY HIS ATTORNEYS.
Williamson & Williamson Patented Mar. 4, 1941

2,233,689

UNITED STATES PATENT OFFICE 2,233,689

APPARATUS FOR DEVELOPING VISUAL FUSION

Frank F. Wildebush, Minneapolis, Minn.

Application October 20, 1937, Serial No. 170,039

6 Claims. (Cl. 88—20)

This invention relates to optical treating devices. More specifically it relates to apparatus for developing visual fusion whereby eye squint can be treated.

The essential factor of treatment in the correction of eye squint is the development of visual fusion. If the patient can be brought to use both eyes and to fuse the image transmitted to the right eye with the image transmitted to the left eye, successful treatment can be given to the eyes tending to rectify the eye squint. It is recognized generally by ophthalmologists that most devices now used for treating eye squint are subject to the objection that the interest of the patient is not stimulated to develop visual fusion because of the fact that most such devices can be employed to view merely specially prepared subject matter. The patient quickly becomes bored with the use of such devices when he can view only prepared subject matter and the involuntary effort of the patient to secure visual fusion is then lost.

It is therefore an object of the present invention to provide novel devices for developing visual fusion which can be easily and conveniently used, while the patient is viewing anything, whereby subjects such as moving pictures, football games, landscapes, etc., can be viewed which stimulate the interest of the patient, causing him to involuntarily exert an effort to obtain visual fusion.

A more specific object is to provide a novel apparatus for developing visual fusion which when used will permit transmission of only portions of an image of a visual field of any type or character to the right eye of the patient while permitting transmitting of other and substantially complementary portions of an image of the visual field to the left eye of the patient, whereby the patient will be induced to use both eyes and to fuse the portion of the image transmitted to the right eye with the portion of the image transmitted to the left eye in order that clear perception of the entire object can be obtained.

Another more specific object is to provide periscope-like attachments for each eye of the patient, said periscope-like attachments being equipped with inner mirrors having reflecting portions which are complementary one to the other so that full view of any visual field can be obtained only by properly fusing that portion of an image transmitted to the right eye with that portion of an image transmitted to the left eye.

The objects and advantages of the invention will more fully appear from the following description, made in connection with the accompanying drawing, wherein a device embodying the invention is illustrated and in which drawing like reference characters refer to the same or similar parts throughout the various views, wherein Fig. 1 is a plan view of the optical treating device;

Fig. 2 is a view looking toward the inner end of a portion of the device;

Fig. 3 is a vertical section taken on the line 3—3 of Fig. 1, as indicated by the arrows;

Figs. 4 and 5 are face views of a pair of inner mirrors that may be employed in the device;

Figs. 6 and 7 are face views of other inner mirrors that may be used;

Fig. 8 is a face view of one of the prisms that may be employed; and

Fig. 9 is a vertical section taken on the line 9—9 of Fig. 8, as indicated by the arrows.

Referring to the drawing, the device as illustrated generally stated consists of a periscope R for the right eye of the user, a periscope L for the left eye of the user and a suitable holder H for mounting the two periscopes R and L for convenient application in front of the eyes of the user.

The holder H as illustrated may consist of an ordinary spectacle frame having a nose piece or nose bridge 10 and rims 11, temples 12 being hingedly connected to outer projecting lugs on the rims. The rims 11 are preferably made somewhat larger than usual and at their tops they are provided with forwardly projecting lugs 13.

The inner ends of the two periscopes R and L are received within the openings of the rims 11. These two periscopes R and L are of generally similar construction. The casing of each periscope is preferably made up of a number of sections assembled together by screw threaded joints. Each periscope casing includes a main section 14 having a lower horizontal tubular portion 14a open at its rear end and closed at its forward end. Joining the horizontal tubular portion 14a and extending preferably upwardly therefrom at right angles thereto is an extension 14b. This extension has an opening at the forward end of the periscope preferably closed as by glass 15. At the upper jointure between the horizontal tubular portion 14a and the extension 14b there is located a short inclined rib 16 forming a bearing. The forward upper edge of the extension 14b is inclined parallel to the rib 16 to form an opposite bearing surface 17. An outer mirror 18 preferably of convex curvature is provided for each periscope and this mirror is preferably held in a ring frame 19 carrying pivot pins journaled respectively in the rib 16 and the bearing surface 17. The uppermost pivot pin of the mirror frame carries a short arm 20 equipped with a thumb set screw 21 which will act against the bearing surface 17 to set the mirror 18 at a desired lateral tilt. The general plane of the mirror 18 is at a 45° angle relative to the horizontal preferably.

Inner mirror rings or frames 22 are secured as by brackets 23 at the forward part of the horizontal tubular portion 14a of each main section 14 of each periscope casing. A mirror such as mirror 24 or mirror 24a is received and held within the mirror ring 22 of the right hand periscope R while similarly a mirror such as the mirror 25 or the mirror 25a is received and held within the mirror ring 22 of the left hand periscope L. When the mirror 24 is used in the right hand periscope R the mirror 25 will be used in the left hand periscope L, while when the mirror 24a is used in the right hand periscope R the mirror 25a will be used in the left hand periscope L. The mirror rings or frames 22 are so located that they are set preferably at 45° angles in position to cause the inner mirrors held thereby to receive the images reflected from the outer mirrors 18 and reflect these images horizontally rearwardly through the lower tubular portions 14a of the main sections 14 of the two periscopes.

The mirrors 24 and 25 and mirrors 24a and 25a are of peculiar construction. Referring first to the mirrors 24 and 25, both of these mirrors have checkerboard blackened blocks 26 on the surfaces thereof to leave checkerboard mirror surfaces 27 on the surfaces thereof between the blackened blocks. The blackened blocks 26 on the mirror 24 are staggered relative to the blackened blocks 26 on the mirror 25 so that these blackened blocks are substantially complementary on the two mirrors while the checkerboard mirror surfaces 27 of the two mirrors are also substantially complementary. The mirrors 24a and 25a have blackened spaced bars 28 thereon to leave barred mirror surfaces 29 thereon. The blackened bars 28 of the mirror 24 are so staggered relative to the blackened bars 28 on the mirror 25a that the blackened bars of the two mirrors are substantially complementary to each other, thereby leaving barred mirror surfaces 29 on the two mirrors which are substantially complementary to each other. If the mirrors 24a and 25a are used, the mirrors may be so located that the bars run either vertically or horizontally or for that matter in any desired direction, it being only necessary that the bars of the two mirrors extend in the same direction.

Rearward of the two inner mirror frames 22 both of the periscopes are provided with stop flanges 30 against which magnifying lenses 31 bear, these lenses preferably being convex on both surfaces. Tubular mid sections 32 are received within the rear portions of the main sections 14 of the periscope casings, these mid sections being preferably attached removably by screw threaded joints and the forward ends of the mid sections 32 bearing against the magnifying lenses 31 to hold them in position against the flanges 30. The inner end portions of the mid sections 32 are channeled to receive channeled rings 33 carrying prisms 34. The forward edges of the rings 33 are preferably equipped with rack teeth 35 which cooperate with small pinions 36 mounted on stub shafts 37 journaled in the upper parts of the mid sections 32, projecting therethrough and carrying knurled heads 38 at their upper ends. By this construction it is possible to rotate the prisms 34 so that the bases of these prisms may be turned to any desired position relative to the eyes of the patient. Preferably these prisms 34 are provided with hair lines 34a on their inner faces as best shown in Fig. 8, so that it is possible to determine the position of these prisms relative to the periscope casings.

Having screw threaded connection with the mid sections 32 of the periscope casings are inner tubular sections 39. Bearing against the inner ends of the inner sections 39 are eye glass lenses 40 of the proper shape and type for use in ordinary eye glasses by the patient to be treated. The lenses 40 close the inner ends of the periscope housings and they are held in place by means of inwardly flanged apertured caps 41 having screw threaded engagement with the inner sections 39.

The periscopes R and L are connected to the rims 11 of the holder by means of lower vertical pivot pins 42 and upper vertical pivot pins 43 attached to the inner sections 39 of the housings, these pivot pins being received in appropriate openings formed in the rims 11. These is sufficient clearance between each rim 11 and its adjacent periscope housing received therein to permit of limited turning movement of the periscope relative to the holder H. This permits the two periscopes L and R to be tilted slightly toward each other in a converging relation or to be tilted slightly outwardly from each other in a diverging relation. To secure the periscopes in adjusted position relative to the holder H, the upper pivot pins 43 are equipped with short arms 44 which overlie the lugs 13 and these arms carry thumb screws 45 which may be tightened downwardly against the lugs 13.

While the mirrored surfaces 27 and 29 of the mirrors 24, 25 and 24a, 25a may be made in any desired manner, it is preferable that these surfaces be exteriorly rather than interiorly mirrored to secure best reflection results.

In using the device the holder H will be applied to the face in the same manner as ordinary glasses, so that the periscope R is located directly ahead of the right eye of the user and the periscope L is located directly ahead of the left eye of the user. The device can be employed for viewing any visual field but preferably a visual field such as a moving picture, a football game or a field wherein moving objects are found will be chosen in order to stimulate the attention of the user. As the user views the visual field, an image from the same will be reflected from the outer convex mirror 18 of the right hand periscope R onto the inner mirror 24 of the periscope R assuming that the two mirrors 24 and 25 are being used. The reflecting surfaces 27 of the mirror 24 will receive portions of the image and reflect these portions back through the magnifying lens 31, prism 34 and lens 40 of the periscope R to the right eye of the user. The right eye will then observe only certain portions of the visual field. Similarly, the outer convex mirror 18 of the left hand periscope L will reflect an image of the visual field onto the inner left hand mirror 25 and the reflecting surfaces 27 of this mirror will reflect only certain portions of the image of the visual field through the magnifying lens 30, prism 34 and lens 40 of the periscope L to the left eye of the user. The portions of the image reflected to the right eye are substantially complementary to the portions of the image reflected to the left eye by reason of the substantially complementary arrangement of the blackened blocks 26 and the reflecting blocks 27 of the two mirrors 24 and 25. In order for the user therefor to view the entire image of the visual field, it is necessary that the user employ both eyes in sight and it is further necessary for the user to cause registration of the portions of the image viewed by the right eye with the portions of the image viewed by the left eye in the brain. In other words, the portions of the images viewed by the two eyes must be fused together so that proper fusion takes place, if the entire object is to be viewed. The visual field chosen will preferably be one which is of interest to the user, so that the user will involuntary make a marked effort to secure fusion so that the complete visual field can be viewed.

While it is not absolutely essential that the outer mirrors 18 be convex as shown, this is highly desirable to assure as wide a range of sight as possible. As lateral adjustment of the outer mirrors 18 is permitted, these mirrors can be set to meet the pecularities of eye sight of the individual user. The magnifying lenses 30, of course, magnify the image which is highly desirable, although not absolutely essential. I employ the prisms 34 to assist in securing proper registration of the portions of the images viewed by both eyes. By rotating these prisms to various positions, I can increase or decrease the difficulty of securing fusion to cause proper exercise of the eye muscles while the device is being used. Also by use of the prisms 34 through adjustment of one prism relative to the other, I can adapt the device to the pecularities of the eyes of the individual user, so that under all circumstances fusion can be obtained. The lenses 40 are employed which are suited to the particular user in the same manner as are his eye glasses, so that the user may secure as close to normal vision as is possible.

By so constructing the device that the two periscopes R and L can be set in either slightly converging relation or diverging relation, further adjustment of the device to the peculiarities of the sight of different individuals can be obtained.

In certain instances, it may be desirable to employ the barred inner prisms 24a and 25a in place of the checkerboard prisms 24 and 25. Of course, many other designs of complementary patterns of blackened portions and reflecting portions for the inner mirrors can be employed.

My process of securing fusion consists essentially in reflecting an image of portions of a visual field to one eye while substantially reflecting complementary portions of an imgae of the visual field to the other eye. It is necessary that mirrors having substantially complementary reflecting surfaces be employed to carry out the objects of the invention. Screens having complementary apertures will not accomplish the purposes intended for the reason that when screens are employed the entire visual field is viewed through such openings as may be provided in the screens.

Many different types of holders may be substituted for the holder H for mounting the two periscopes. Also if desired the extensions 14b may be extended laterally instead of vertically from the portions 14a of the periscope casings. Many other changes may be made in the assembly and details of the construction of the two periscopes.

It will be seen that an extremely simple and effective process has been provided for securing fusion between the two eyes of a person afflicted with eye squint or other eye trouble. It will also be seen that an extremely simple and efficient device has been provided which can be employed without difficulty to develop visual fusion.

It will of course be understood that many other changes may be made in the form, details, arrangement and proportions of the various parts without departing from the scope of the present invention, which generally stated, consists in the matter shown and described and set forth in the appended claims.

What is claimed is:

1. In a binocular device, a supporting structure adapted to be placed in front of the eyes of a patient and including right and left tubular passages through which the right and left eyes of the patient may respectively peer, right and left outer mirrors mounted in the outer portions of the respective tubular passages, right and left inner mirrors mounted in the respective passages inwardly from the outer mirrors, said right and left inner mirrors each having a plurality of reflecting zones and each having a pluality of non-reflecting zones and at least certain portions of the reflecting zones of the right inner mirror corresponding in positions on the right inner mirror to the positions that the non-reflecting zones of the left inner mirror take on the left inner mirror and at least certain portions of the reflecting zones of the left inner mirror corresponding in positions on the left inner mirror to the positions that the non-reflecting zones of the right inner mirror take on the right inner mirror, said right outer mirror being located to reflect light rays from a visual field on to the right inner mirror and the right inner mirror being located to reflect from the reflecting zones thereof certain of such light rays to the right eye of the patient, said left outer mirror being located to reflect light rays from the same visual field on to the left inner mirror and the left inner mirror being located to reflect from the reflecting zones thereof certain of such last mentioned light rays to the left eye of the patient.

2. The structure defined in claim 1, and right and left triangular prisms mounted in said respective passages inwardly from said respective inner mirrors.

3. The structure defined in claim 1, right and left triangular prisms mounted in said respective passages inwardly from said respective inner mirrors, and individual means for turning each prism relative to the passage within which it is located.

4. The structure defined in claim 1, and means for tilting the outer mirrors slightly relative to the inner mirrors.

5. The structure defined in claim 1, means for tilting the outer mirrors slightly relative to the inner mirrors and right and left triangular prisms mounted in said respective passages inwardly from said respective inner mirrors and individual means for turning each prism respective to the passage within which it is mounted.

6. In a binocular periscope, a supporting structure adapted to be placed in front of the eyes of a patient and including right and left tubular passages through which the right and left eyes of the patient may respectively peer, right and left mirrors mounted in said respective right and left passages for reflecting light from an object to the right and left eyes respectively, said right and left mirrors each having a plurality of reflecting zones and each having a plurality of non-reflecting zones, at least portions of the reflecting zones of the right mirror corresponding in positions on the right mirror to the positions that the non-reflecting zones of the left mirror take on the left mirror and at least portions of the reflecting zones of the left mirror corresponding in positions on the left mirror to the positions that the non-reflecting zones of the right mirror take on the right mirror, right and left light reflecting means mounted in said tubular passages respectively ahead of said mirrors reflecting light rays from the said visual field to said mirrors and light reflecting means mounted in said tubular passages respectively behind said mirrors reflecting such rays as are reflected by the mirrors to the respective eyes.

FRANK F. WILDEBUSH.